Figure 1:
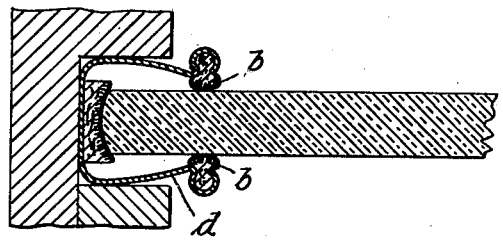

Aug. 23, 1932.　　　E. W. M. BAILEY　　　1,873,529

LUBRICATED WINDOW GLASS RUNWAY

Filed March 23, 1931

Inventor.
Edwin W. M. Bailey.
by L. H. Harriman
Atty.

Patented Aug. 23, 1932

1,873,529

UNITED STATES PATENT OFFICE

EDWIN W. M. BAILEY, OF AMESBURY, MASSACHUSETTS

LUBRICATED WINDOW GLASS RUNWAY

Application filed March 23, 1931. Serial No. 524,623.

This invention relates to window glass runways employed in closed body automobiles and more particularly to means and methods of treating runways which are lined with cushioning material such as felt or fabric.

Window glass runways of this general character which are principally employed, comprise a channel of metal or rubber, which is lined with some form of cushioning material such as felt, or various forms of textile material.

To secure satisfactory results with a runway of this character, the glass must be held under considerable pressure by the cushioning material, so as to avoid breakage and prevent rattling, but it should also be permitted to slide freely under all conditions. Cushioning material of this character is usually principally affected by the presence of moisture which, in many instances causes the material to swell so as to prevent movement of the glass, or so increase the frictional resistance on the glass that the glass can only be moved with great difficulty, if it can be moved at all. Moreover, when the cushioning material is pressed against the glass with sufficient force to prevent rattling, or breakage from shocks to which the glass is frequently subjected by closing a door with considerable force, the material is likely to become worn to such an extent that the edges of the metal channels engage the glass and cause chattering. Felt linings sometimes stick to the glass, so that they are forced into bunches and have a wedging effect sufficient to prevent sliding movement of the glass.

While certain woven fabrics might be employed for this purpose which are not seriously affected by moisture, such materials are usually objectionable on account of their high cost, or because they do not have sufficient cushioning effect.

In attempting to obviate the difficulties above referred to I have employed various kinds of lubricating means in connection with different cushioning materials, but, prior to my present invention, the results were unsatisfactory principally because any lubricating means which I employed which was satisfactory to some extent, was so only temporarily, or was affected by temperature changes, so that adhesion of the glass to the cushioning material was likely to occur.

The objects of my invention are to provide means whereby cushioning material employed in window glass runways may be treated so that it may be engaged with the glass with sufficient pressure to afford an effective cushioning and holding means for the glass, and will at the same time permit the glass to slide freely under all ordinary conditions of temperature and moisture, and for indefinitely long periods, and will prevent the material from becoming matted, or forced into bunches, or worn so as to permit chattering, or engagement of a metal channel with the glass.

I accomplish these objects by saturating and coating the portion of the cushioning material which comes in contact with the glass with a mixture of pulverized graphite and liquefied binder, such as shellac dissolved in a suitable solvent, and then permitting the solvent to evaporate.

Figure 2:
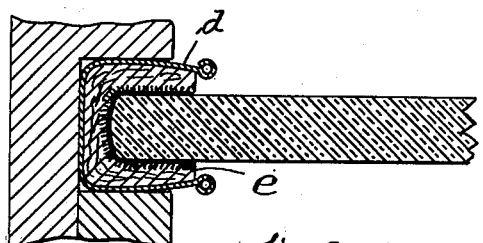

For a more complete disclosure of the invention, reference is made to the following specification in connection with the accompanying drawing, in which:

Figs. 1 and 2 are cross-sectional views of different forms of window glass runways which have been treated in accordance with my invention.

In Fig. 1 a type of window glass runway is shown which is disclosed in my Patent No. 1,680,315 of August 14, 1928, and which comprises a U-form metal channel $a$ having cotton cords, or strips of cushioning material $b$ clamped in the edge portions of the channel sides, for engagement with the sides of the glass, and a cushion $c$ on its base for engagement with the edge of the glass.

In Fig. 2 a type of runway is shown which is extensively employed and which comprises a U-form metal channel $d$ having a felt lining $e$, as shown in my Patent No. 1,521,168 of December 30, 1924.

According to my invention I provide a mixture of approximately equal quantities of pulverized graphite and a binder which preferably consists of shellac and is dissolved in a sufficient proportion of alcohol to form a freely flowing liquid mixture. This mixture may be applied in any convenient manner to the glass engaging surfaces of the cushioning material b, c or e, several applications being preferable, so that the mixture will first penetrate the material to a substantial extent and further applications will provide a substantial coating f, after the alcohol has evaporated and the shellac has set. The cushioning material thus becomes somewhat saturated with the graphite and a coating thereof becomes fixed on the glass engaging surfaces thereof, so that the glass may be easily moved in its runway and, at the same time, the sides of the runway may be pressed against the glass with sufficient force to hold it securely against vibration and shock. Moreover, the lubricating effect on the glass will be substantially increased by the presence of moisture, rather than reduced thereby. The graphite will be securely held by the shellac in position to lubricate the glass at its points of engagement with the cushioning material, and the coating of the lubricant may be made of such thickness, and the extent to which it may be made to penetrate the material is such that effective lubrication of the glass for an indefinitely long period will be provided. As graphite and shellac are practically impervious to moisture, a water proof coating will be applied to the cushioning material, so that swelling which might otherwise be caused by moisture will ordinarily be prevented.

While the above described method of treating window glass runways is considered to be particularly advantageous when employed in connection with cushioning material which is highly absorbent, it may also be employed to advantage in connection with the less expensive type of cloth covered rubber channel above referred to, which is only slightly absorbent comparatively.

Although I consider thin shellac preferable to any other binder of which I am aware as a means for holding a coating of the pulverized graphite on the surface of the material, and for causing it to penetrate the material so as to provide effective and practically permanent lubrication for the sliding glass other forms of binders may be employed, provided they have similar characteristics, but shellac is particularly advantageous, as it sets quickly, is a strong adhesive which is not tacky or sticky, and has considerable tenacity and is not affected by moisture, or ordinary temperature changes.

For example certain compounds or forms of wax which might act as a binder, and might operate satisfactorily at a constant low temperature, would become softened at summer temperature, and on cooling, would then adhere so firmly to the glass that the glass could not be moved in its channel by the usual operating means.

While alcohol has been referred to as a suitable solvent of the shellac, various other well known commercial solvents may be employed in lieu thereof. For example certain alkalies, such as ammonia and water would be suitable for the purpose, but any solvent which would tend to cause deterioration of the fibrous material of which the cushioning material of the runway is usually composed would obviously be unsuitable for the purpose.

By treating and coating the glass engaging cushioning material of the runway in the above described manner, the window glass will not only be permitted to slide more freely under all conditions, but the pressure with which the material may be engaged with the glass may be substantially increased, so that the glass will be held much more securely and the danger of rattling and breakage by shock may be materially reduced.

The proportions of the graphite and binder with which it is mixed may be considerably varied without substantially affecting the results secured.

I claim:

A window glass runway comprising absorbent cushioning material for engaging the glass, said material having its glass engaging portion impregnated and its surface coated with a mixture of pulverized graphite and shellac.

In testimony whereof, I have signed my name to this specification.

EDWIN W. M. BAILEY.